United States Patent [19]

McCleery

[11] 4,327,397
[45] Apr. 27, 1982

[54] COMPUTER POWER/TEMPERATURE PROTECTOR

[76] Inventor: Winston T. McCleery, 4920 Cottage Hill Rd., Ste. 5, Mobile, Ala. 36609

[21] Appl. No.: 156,342

[22] Filed: Jun. 4, 1980

[51] Int. Cl.³ .................. H02H 3/20; H02H 3/24; H02H 5/04
[52] U.S. Cl. .................................. 361/90; 361/91; 361/92; 361/103; 361/114
[58] Field of Search ............... 361/92, 103, 111, 114, 361/127, 194, 90, 91

[56] References Cited

U.S. PATENT DOCUMENTS

| | | | |
|---|---|---|---|
| 3,167,685 | 1/1965 | Bade et al. | 361/92 X |
| 3,795,842 | 3/1974 | Kovacs | 361/92 |
| 4,064,546 | 12/1977 | Domanski | 361/92 X |
| 4,086,643 | 4/1978 | Jacobs | 361/92 |
| 4,171,533 | 10/1979 | Schrader | 361/92 X |
| 4,174,530 | 11/1979 | Kresge et al. | 361/127 |

Primary Examiner—Reinhard J. Eisenzopf
Attorney, Agent, or Firm—Larry S. Nixon

[57] ABSTRACT

A computer power/temperature protector is provided. A control and disconnect circuit is responsive to a power interruption to disconnect power from a computer to which the protector unit is connected in-line, and thereafter responsive to a reset signal to connect power to the computer. A power interruption is obtained automatically when a voltage failure occurs on the power cable to the computer. A thermostatic switch also automatically interrupts power when the ambient temperature of the room in which the computer or other load is located exceeds an adjustable pre-set level. A power emergency disconnect switch is provided for manually interrupting power. Furthermore, the present invention provides at least one varistor for shunting transient voltages. The varistors are automatically connected to the power lines of the cable when the apparatus is manually reset to supply power to the computer.

11 Claims, 2 Drawing Figures

COMPUTER POWER/TEMPERATURE PROTECTOR

BACKGROUND OF THE INVENTION

The present invention relates to protective apparatus for a computer and other types of sensitive electrical or electronic loads, and more particularly to apparatus for insertion in a computer power cable to protect the associated computer from power transients, excessive ambient temperatures, and emergency conditions. Furthermore, the present invention relates to manually resettable computer protective apparatus.

A number of voltage/current sensitive control circuits, temperature-sensitive switch circuits, and transient suppression circuits are found in the prior art. Generally they are intended for specific applications.

In the category of voltage/current sensitive supply switching circuits, U.S. Pat. No. 3,037,151, issued to Cimerman et al on May 29, 1962, discloses a voltage monitoring circuit for interrupting the power being supplied to a plurality of power supplies when the ratio of the output voltages from those power supplies sufficiently varies from a predetermined value. An actuating coil of a normally-closed relay switch opens that switch to interrupt the power. U.S. Pat. No. 3,167,685, issued to Bade et al on Jan. 26, 1965, discloses a computer protection circuit that monitors the output of a plurality of power supplies and, in the event of a failure of any one or more of the power supplies quickly removes all power being supplied from them to the computer. Each power supply includes an overload relay. In the event of a power supply failure, the computer protection circuit short-circuits the outputs of the power supplies, thereby overloading the power supplies. The overload relay of each power supply responds by opening the associated power supply line, which remains open until the relay is reset.

In the category of temperature sensitive switch circuitry, U.S. Pat. No. 2,597,185, issued to Roeding et al on May 20, 1952, discloses a self-protected distribution transformer having two bimetal elements responsive both to the temperature of the transformer oil and to the current flowing in the transformer secondary circuit. Either bimetal element is effective to trip a breaker, thereby interrupting the current flow through both poles of the breaker and completely disconnecting the secondary circuit from the distribution circuit supplied from the transformer.

In the category of transient protection circuitry, U.S. Pat. No. 4,023,071, issued to Fussell on May 10, 1977, U.S. Pat. No. 4,068,279, issued to Byrnes on Jan. 10, 1978, and U.S. Pat. No. 4,152,743, issued to Comstock on May 1, 1979 disclose varistors in suitable circuits for providing transient voltage protection. The patent to Comstock further discloses certain temperature sensitive devices in series with a respective varistor. These devices conduct when the current therethrough or the temperature thereof is below a certain level, and do not conduct when the current therethrough or the temperature thereof exceeds a certain level.

Therefore, it is desirable to provide a simply installed apparatus for protecting a computer system from harmful power line voltage transients, and for cutting off power to the computer in the event of excessive computer room ambient temperature and other such environmental conditions, source power failure, and emergency conditions. It is desirable for power cut-off due to such conditions as excessive temperature and source power failure to be automatic. Emergency conditions, which require operator discretion, should not cause automatic power cut-off; rather, the capability for manual cut-off is desirable therefor. Furthermore, restoration of power to the computer should not occur with power failure recovery or correction of the condition. Restoration of power requires the discretion of the computer operator, and therefore should be manually effected. It is desirable for the protective apparatus to be compatible with a wide variety of computer systems, particularly those powered by conventional one or three phase A.C. supplies.

SUMMARY OF THE INVENTION

The present invention provides protection for a computer or other types of sensitive electrical or electronic loads against several different kinds of undesirable conditions. The present invention is quickly, easily, and inexpensively installed in the power cable of the computer or other load, in proximity thereto. No modification to or contact with the computer or other load is necessary.

According to the present invention, power is cut-off from the load automatically in response to electrical line power failure and excessive ambient air temperature, and manually in response to undesirable emergency conditions and other conditions for which automatic power interruption is not provided. The apparatus is manually reset. Undesirable transient voltage conditions are moderated in the power supplied to the load.

In one embodiment of the present invention, all power lines in the power cable to the load are controllably rendered non-conductive in response to an interruption in the voltage being supplied to a control relay. The voltage interruption may be obtained in a number of ways. The control relay itself is sensitive to power failure occurring on at least one of the power lines to controllably render all power lines non-conductive. Temperature sensing means also automatically effects a voltage interruption in response to deviation in the sensed temperature from a preselected temperature range. A voltage interruption may be manually effected in response to unanticipated, disregarded, or otherwise unprovided-for conditions by means of a suitable switch. Once the cause of the voltage interruption is removed, a current flow through the control relay is again established by operation of suitable switching means. Voltage transients appearing on all power lines are also shunted by suitable means to protect the computer or other load from this additional kind of undesirable condition.

BRIEF DESCRIPTION OF THE DRAWINGS

In the figures, where like numbers indicate like parts.

DETAILED DESCRIPTION OF THE INVENTION

Figure 1:
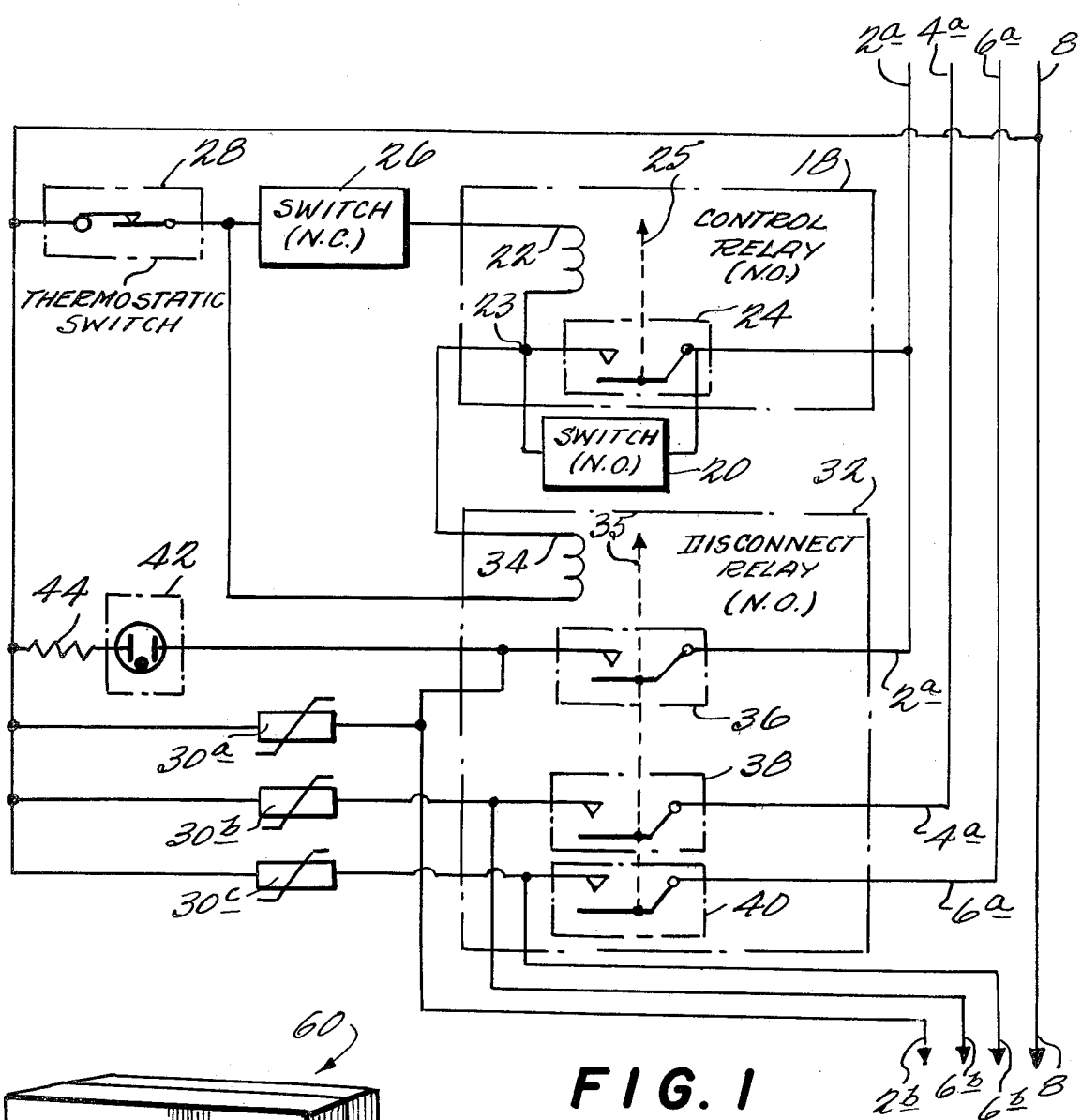
FIG. 1 is a schematic diagram of a protector circuit in accordance with the present invention.

The computer power/temperature protector according to the present invention is suitable for insertion into the power cable of a computer (or other types of sensitive electrical/electronic loads) in the environment of the computer or other load to protect automatically against such conditions as power failure, power transients, and high ambient temperature; and to provide manual emergency power shutdown capability for disregarded, unanticipated or otherwise unprovided for conditions. The protector circuitry, shown schematically in FIG. 1, is suitable for use in a one or three-phase power system. A power cable comprises lines 2 (2a and 2b), 4 (4a and 4b), 6 (6a and 6b), and 8. Lines 2a, 4a and 6a convey power from a power generation system (not shown), while line 8 is a grounded (or neutral) conductor. Lines 2b, 4b and 6b are connected to the computer (not shown) or other suitable load for conveying power thereto, subject to the influence of the protector unit. The connection and disconnection of the input lines 2a, 4a and 6a to the output lines 2b, 4b and 6b is effected by the disconnect relay 32, which is controlled by control elements in the protector unit, as described below. Line 8 is unswitched.

In the preferred embodiment, the control elements are a control relay 18, switches 20 and 26 and a thermostatic switch 28. The disconnect relay 32 is suitably controlled by the control relay 18. Relay 18 is preferably a normally open relay having a single set of "control" electrical contacts 24 that are moved by an armature 25 and its associated operating coil 22, as is well known in the art. The normally open switch 20 is connected across the contacts 24. One of the contacts 24 receives power preferably from a preselected one of the input power lines, line 2a as shown in FIG. 1, and the other contact connects to the line 8 through a series connection of the coil 22, the normally closed switch 26, and the normally closed thermostatic switch 28.

By this arrangement, when the switch 20 is depressed, the connection across the normally open contacts 24 is closed, thereby connecting node 23 to line 2a, energizing the coil 22, and closing the contacts 24. Although the switch 20 is thereafter released, the voltage supplied by line 2a continues to be applied to the coil 22 through the closed contacts 24. Node 23 remains connected to line 2a. An interruption of voltage being applied to coil 22 (hereinafter referred to as "voltage interruption"), however, will de-energize the coil 22 thereby opening the contacts 24 and disconnecting node 23 from the line 2a. An interruption of voltage may be caused by any one of several conditions, as herein described. Subsequent restoration of voltage across the control relay 18 will not energize coil 22 until switch 20 is depressed, as described above.

It will be appreciated that node 23 will controllably assume one of two states, depending on whether it is connected or unconnected to line 2a. These states are advantageously used for control purposes insofar as the disconnect relay 32 is connected to node 23, and to the line 8 through the thermostatic switch 28. The disconnect relay 32 comprises a relay coil 34 and three sets of normally open "power" electrical contacts 36, 38 and 40 which are moved concurrently by an associated armature 35, as is well known in the art. When the switch 20 is momentarily depressed and released, the voltage of line 2a is made available at node 23 (assuming the switch 26 and thermostatic switch 28 to be closed). This voltage is applied to the coil 34, energizing coil 34 to close the contacts 36, 38 and 40. The contacts 36, 38 and 40 thereby connect the lines 2a, 4a and 6a provided at the input side thereof to the respective lines 2b, 4b and 6b provided at the output side thereof for supplying power to the associated computer or other loads. When a voltage interruption occurs, line 2a is disconnected from node 23. Coil 34 is de-energized and contacts 36, 38 and 40 open. Lines 2a, 4a and 6a are thereby disconnected from lines 2b, 4b and 6b. Line 8 is not switched.

Voltage transient protection is provided by the varistors 30a, 30b and 30c, which are connected between the line 8 and the output side of the contacts 36, 38 and 40, respectively. As is known, a transient is a quantity of voltage in excess of normal supply which can cause extensive damage to a computer or other sensitive electrical or electronic load exposed to them. For example, if the normal supply voltage is 208 volts, it is not uncommon to experience power line transients of as much as several thousand volts. The varistors 30a, 30b and 30c suitably shunt such transient over-voltages to line 8. Transient over-voltages, even those of microsecond duration, are thereby clamped to approximately twice the normal voltage level, provided the transient voltages are not immediately repetitive. Suitable varistors include type number V130LA20A, manufactured by General Electric Corporation. A neon light 42 and a current limiting resistor 44 are connected in series between a preselected one of the output terminals of the contacts of the disconnect relay 32, preferably the output terminal of contact 36 associated with line 2b, and line 8 to provide a visual indication that power is being supplied to the computer.

According to the present invention, excessive temperature in the environment of the computer is one condition that automatically will cause a voltage interruption. The protector unit according to the present invention is provided with a thermostatic switch 28 which is sensitive to ambient air temperature. When the ambient air temperature reaches a cut-off level pre-set by the user, the normally closed thermostatic switch 28 opens, thereby de-energizing control relay 18 and disconnect relay 32 to disconnect lines 2a, 4a and 6a from the lines 2b, 4b and 6b. Power is effectively removed from the computer.

To reapply power, the protector unit must be manually reset. To prevent the protector unit from being reset while the ambient temperature remains near or above the pre-set level, however, thermostatic switch 28 remains open until the ambient room temperature returns to approximately 5° F. below the cut-off level. As a result, all circuits from the power line 2a to the line 8 will remain open until the thermostatic switch 28 senses a suitably reduced temperature and achieves its normally closed condition. At this time, the thermostatic switch 28 will complete the circuit from the coil 22 of control relay 18 (assuming switch 26 is closed) and from the coil 34 of disconnect relay 32 to the line 8. Contacts 24 of the control relay 18, however, remain open. When switch 20 thereafter is depressed to reset the protector circuitry, the potential at node 23 is raised to the potential of line 2a, thereby energizing the coils 22 and 34 of the control relay 18 and disconnect relay 32, respectively, to provide power at the output lines 2b, 4b and 6b, as described above.

A failure of power on line 2a is another condition that automatically will cause a voltage interruption to occur. When power on line 2a fails, even momentarily, the coil 22 is de-energized. As a result, the contacts 24 open, and subsequent restoration of power will not re-energize the relay 22 unless the switch 20 is depressed to reset the protector unit.

Also according to the present invention, a voltage interruption may be manually effected in response to emergency conditions by means of switch 26. Switch 26 is a normally closed-type switch for maintaining a current path from node 23 through the coil 22 of the control relay 18. In this way, the disconnect relay 32 can be energized when the switch 20 is depressed. When an emergency arises requiring manual disconnection of power, the switch 26 is depressed momentarily to de-energize coil 22 of the control relay 18. Accordingly, power is removed from the node 23 and coil 34 of the disconnect relay 32, and the contacts 36, 38 and 40 open to disconnect lines 2a, 4a and 6a from the lines 2b, 4b and 6b. Power is removed from the computer system, and is restored by resetting the protector unit by manually depressing switch 20, as described above.

Typical specifications for the protector unit are as follows. The input voltage is between 200 and 260 volts, single or three-phase. The power capacity to an external load is 15 KVA. The control circuitry operating voltage is between 108–130 volts. The control drop out level is 190 volts or less. The thermostatic switch cut-off temperature is adjustable between 70° F. and 90° F.

Figure 2:
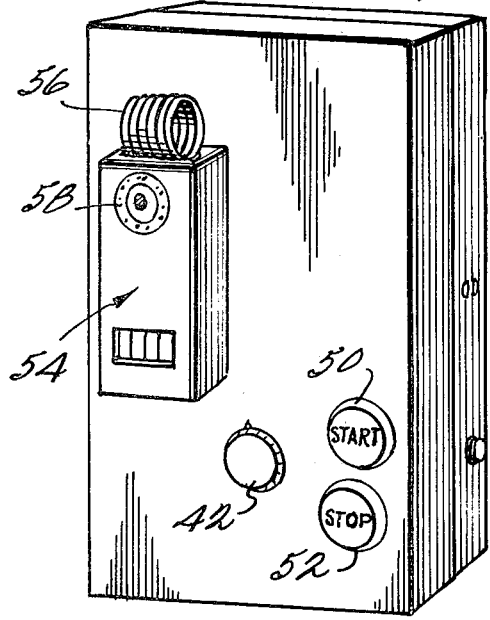
FIG. 2 is a perspective view of a protector unit suitable for wall mounting, according to the present invention.

FIG. 2 shows a protector unit suitable for installation at a computer site. Installation is accomplished by a qualified electrician in approximately 1-2 hours. The protector unit is contained in a suitable cabinet 60 that is mounted on a wall near the computer, approximately 4-5 feet above floor level. A start button 50 associated with the switch 20 is provided for resetting the protector circuitry, and a stop button 52 associated with the switch 26 is provided to emergency cut-off the power supply to the computer. The neon light 42 is mounted on the front of the protector unit panel as a visual indication that power is being supplied to the computer, as aforementioned. A housing 54 for the thermostatic switch 28 is prominently visible on the front panel of cabinet 60, a sensing coil 56 being provided to sense the ambient air temperature and an adjustment gauge 58 being provided to set the high temperature cut-off level.

It will be understood that the above description includes an illustrative embodiment of the present invention, and that the invention is not limited to the specific form shown. Modifications may be made in the design and arrangement of the elements without departing from the spirit and scope of the invention as expressed in the appended claims. For example, any device that suitably shunts voltage transients may be used in place of the varistors 30a, 30b and 30c, respectively, without departing from the spirit and scope of the present invention. Furthermore, any suitable normally-closed sensor-controlled switch may be connected in place of or in addition to the thermostat 28 to provide input power control based on other parameters, such as humidity and/or smoke detection.

What is claimed is:

1. A computer power/temperature protector apparatus adapted for insertion into a power cable having at least one power line, said power cable supplying power to an associated computer load, comprising:
   means for rendering said at least one power line controllably nonconductive and conductive;
   means responsive to an interruption of power being provided thereto for controlling said rendering means to render said at least one power line nonconductive, and responsive to a reset signal for controlling said rendering means to render said at least one power line conductive;
   means for manually generating said reset signal;
   means for shunting voltage transients appearing on said power line;
   temperature sensing means for automatically causing said interruption of power in response to a deviation of sensed temperature from a predetermined temperature range, said reset signal generating means being ineffective for rendering said at least one power line conductive as long as said sensed temperature has deviated from said predetermined range; and
   means for causing said interruption of power manually.

2. The apparatus as in claim 1, wherein a cause of said interruption of power comprises a power failure on at least one of said at least one power line.

3. A computer power/temperature protection apparatus for installation in a power cable to an associated electronic computer device, said power cable having at least one power line and a grounded line, said apparatus comprising:
   a switching circuit having manually operable resetting means; at least one pair of power contacts connected in series with a respective power line and said electronic device; and a pair of control terminals connected between at least one power line and said grounded line, said switching circuit being responsive to an interruption of power being supplied to said control terminals for opening said at least one pair of power contacts, and thereafter responsive only to said resetting means for closing said at least one pair of power contacts;
   a voltage transient shunt circuit connected between said at least one power line and said grounded line;
   a thermostatic switch connected in series with said control terminals for automatically causing said interruption of power in response to an ambient temperature in excess of a preselected cut-off level; and
   a switch connected in series with said control terminals for manually causing said interruption of power.

4. The apparatus of claim 3, wherein said thermostatic switch and said switch are connected in series with one another and with said control terminals.

5. The apparatus of claim 3 or 4, wherein a failure of power on said at least one of said at least one power line provides said interruption of voltage.

6. The apparatus of claim 5, wherein said voltage transient shunt circuit is inoperative when said at least one pair of power contacts is disconnected.

7. The apparatus of claim 3, wherein said voltage transient shunt circuit is inoperative when said at least one pair of power contacts is disconnected.

8. Apparatus as in claim 1 or 3 further comprising a smoke detecting sensor-controlled switch connected in addition to said thermostatic switch to automatically cause said interruption of power and thus to provide input power control based on a detected smoke parameter.

9. A protection apparatus for insertion into a three-phase power cable supplying power to a computer, comprising:
   a lock-up relay having a power terminal connected to a first power line of said power cable, a ground terminal, and a control terminal; a normally-open manually-operated start switch being connected across the control terminal and the power terminal of said lock-up relay for controllably locking said lock-up relay;

a normally-closed manually-operated emergency power stop switch connected in series with said lock-up relay between the ground terminal of said lock-up relay and a ground line of said power cable;

a switching relay having three pairs of controllably switchable contacts, connected in series with said computer and, respectively, said first power line, a second power line, and a third power line of said power cable for controllably removing and applying power to said computer; and further having a power terminal and a ground terminal, the power terminal of said switching relay being connected to the control terminal of said lock-up relay;

a normally-closed thermostatic switch connected in series with said lock-up relay and with said switching relay, between said ground line and, respectively, the ground terminal of said switching relay and a terminal of said stop switch; and first, second, and third varistors connected between said ground line and, respectively, said first, second, and third power lines;

wherein said controllably switchable contacts are closed, and said first, second, and third varistors engaged, when said lock-up relay is locked; and wherein said controllably switchable contacts are opened, and said first, second, and third varistors are disengaged, when said lock-up relay is unlocked; said lock-up relay being unlocked when said thermostatic switch is at least momentarily opened, when said stop switch is momentarily opened, when a momentary power failure occurs on said first power line, and when any combination of the foregoing occurs; and said lock-up relay being locked when, said thermostatic switch and said stop switch being closed and power being available on said first power line, said start switch is at least momentarily closed.

10. A protection apparatus for insertion into a power cable supplying power to an electrical computer, comprising:

a switching relay having at least one pair of controllably switched contacts, each connected in series with a respective power line of said power cable and said computer;

a lock-up relay connected to said switching relay for controllably opening and closing the respective contacts of said switching relay;

a thermostatic switch connected in series with said lock-up relay; and a manual reset switch connected to said lock-up relay;

wherein said series connection of said thermostatic switch and said lock-up relay is connected between at least one power line of said power cable and said ground line for automatically unlocking said lock-up relay in response to an ambient temperature in excess of a preset value, and for enabling said lock-up relay to be controllably locked in response to at least momentary actuation of said reset switch when said ambient temperature is less than said preset value by a predetermined amount.

11. A protection apparatus for insertion into a power cable supplying power to an electrical computer, comprising:

a switching relay having at least one pair of controllably switched contacts, each connected in series with a respective power line of said power cable and said computer;

a lock-up relay connected to said switching relay for controllably opening and closing the respective contacts of said switching relay;

a manual stop switch connected in series with said lock-up relay; and a thermostatic switch connected in series with said stop switch and said lock-up relay;

wherein said series connection of said thermostatic switch, said stop switch, and said lock-up relay is connected between at least one power line of said power cable and said ground line for, respectively, automatically unlocking said lock-up relay in response to an ambient temperature in excess of a preset value, and controllably unlocking said lock-up relay in response to emergency conditions; said thermostatic switch further enabling said lock-up relay to be locked when said ambient temperature is less than said reset value by a predetermined amount.

* * * * *